United States Patent [19]
Huang et al.

[11] Patent Number: 5,448,569
[45] Date of Patent: Sep. 5, 1995

[54] HANDOFF MONITORING IN CELLULAR COMMUNICATION NETWORKS USING SLOW FREQUENCY HOPPING

[75] Inventors: Chia-Chi Huang, Hsinchu, Taiwan; David F. Bantz, Chappaqua, N.Y.; Frederic Bauchot, Saint Jeannet, France; Kadathur S. Natarajan, Millwood; Anand Narasimhan, New York, both of N.Y.; Michele M. Wetterwald, Cagnes Sue Mer, France

[73] Assignee: International Business Machines Corporation, Armonk, N.Y.

[21] Appl. No.: 226,724

[22] Filed: Apr. 12, 1994

[51] Int. Cl.6 .................... H04B 7/216; H04B 7/26
[52] U.S. Cl. ............................. 370/95.1; 375/202; 379/60; 455/33.2; 455/56.1; 455/67.3
[58] Field of Search ............... 370/13, 17, 18, 24, 370/29, 30, 50, 69.1, 77, 85.1, 94.1, 95.1, 95.3, 100.1; 379/58, 59, 60; 455/33.1, 33.2, 34.1, 34.2, 53.1, 54.1, 56.1, 67.1, 67.3, 68, 69, 70; 375/200, 202

[56] References Cited

U.S. PATENT DOCUMENTS

| | | | |
|---|---|---|---|
| 5,042,082 | 8/1991 | Dahlin | 379/60 |
| 5,123,029 | 6/1992 | Bantz et al. | 375/1 |
| 5,181,200 | 1/1993 | Harrison | 370/85.1 |
| 5,267,261 | 11/1993 | Blakeney, II et al. | 375/1 |
| 5,276,906 | 1/1994 | Felix | 455/33.2 |
| 5,293,643 | 3/1994 | Israelsson | 455/33.2 |
| 5,323,446 | 6/1994 | Kojima et al. | 370/95.1 |
| 5,371,738 | 12/1994 | Moelard et al. | 370/85.1 |

Primary Examiner—Alpus Hsu
Attorney, Agent, or Firm—Perman & Green

[57] ABSTRACT

Methods for handoff in a wireless communication network including a local area network connected to a plurality of base stations, each of which has a geographic area, defined as a cell, within which mobile stations can communicate with a base station, with each such base station being capable of performing bidirectional wireless communication with one or more of said mobile stations under control of a controller, with communication between base stations and mobile stations being performed by frequency hopping, with there being n available frequency hopping channels in a fixed frequency band, with each channel being of a same fixed duration and having a fixed frequency different than another channel. The handoff method employs structure and techniques for determining by a mobile station that the quality of transmission between itself and a current base station has degraded below a predetermined performance level, structure and technique for the mobile station to listen to each of successive frequency channels for a duration substantially less than the fixed duration of a channel until it senses a transmission from another base station, and structure and techniques for transferring control of the mobile station to another base station in response to the sensed transmission.

10 Claims, 6 Drawing Sheets

FH i = FREQUENCY HOP i

| TABLE 1. | LIST OF CANDIDATE BASES | | |
|---|---|---|---|
| B(1) | B(2) | ... | B(K) |
| RSSI(1) | RSSI(2) | ... | RSSI(K) |
| HOR(1) | HOR(2) | ... | HOR(K) |
| LV(1) | LV(2) | ... | LV(K) |

HANDOFF MONITORING IN CELLULAR COMMUNICATION NETWORKS USING SLOW FREQUENCY HOPPING

BACKGROUND OF THE INVENTION

1. Field of the Invention

The present invention relates to wireless cellular communication networks having a local area network connected to a number of base stations, each of which can communicate with and control mobile stations, and more particularly to a cellular communication network wherein control of a mobile station is handed off to another base station.

2. Description of the Prior Art

U.S. Pat. No. 5,181,200 issued Jan. 19, 1993 to Harrison entitled "HANDOFF METHOD AND APPARATUS FOR MOBILE WIRELESS WORKSTATION" describes a system which, in response to a data processor breaking a wireless link with a first, original, link adapter a first step deletes the data processor from an active group of the first link adapter and re-directs network datagrams intended for the data processor subsequently establishing a link with a second, new, link adapter a next step adds the data processor to the active group associated with the second link adapter and transmits stored datagrams in a First In/First Out order from the spooler to the second link adapter for transmission to the data processor. In response to the storage device transmitting all of the stored datagrams to the second link adapter the method includes the further steps of terminating the re-direction of datagrams from the first link adapter to the storage device and, receiving, from the network with the second link adapter, further datagrams addressed to the data processor.

U.S. Pat. No. 5,123,029 issued Jun. 16, 1992 to Bantz et al. entitled "BROADCAST-INITIATED BIPARTITE FRAME MULTI-ACCESS PROTOCOL" discloses a hybrid of controlled access and random access schemes using frequency hopping spread spectrum communication techniques is implemented in an indoor digital data radio communication system between mobile stations and a computer system. A hop in the frequency hopping spread spectrum communication system is subdivided into two intervals so that different media-access protocols can be used in each interval. The protocol uses a centralized control scheme and the intervals may be varied depending on the load of the system.

SUMMARY OF THE INVENTION

It is an object of the present invention to provide a cellular communication network having base stations and mobile stations wherein a mobile station can determine that the quality of transmission to its home base station has degraded below a predetermined performance level.

Another object of the present invention is to provide a cellular communications network wherein a mobile station can monitor and sense transmissions from base stations other than its home base station.

A further object of the present invention is to provide a cellular communication system wherein control of a mobile station is transferred from a first home base station to a new home base station in response to sensed transmissions.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE PREFERRED EMBODIMENT

The present invention generally relates to indoor digital data radio communication between a plurality of stations for the purpose of communicating among the stations and accessing various resources attached to the stations. A plurality of mobile stations communicate with one or more fixed base stations attached to a computer system, such as a local area network. The base station exercises control over access to the radio channel by periodically broadcasting messages that demarcate fixed intervals of time, called "frames".

Figure 1:
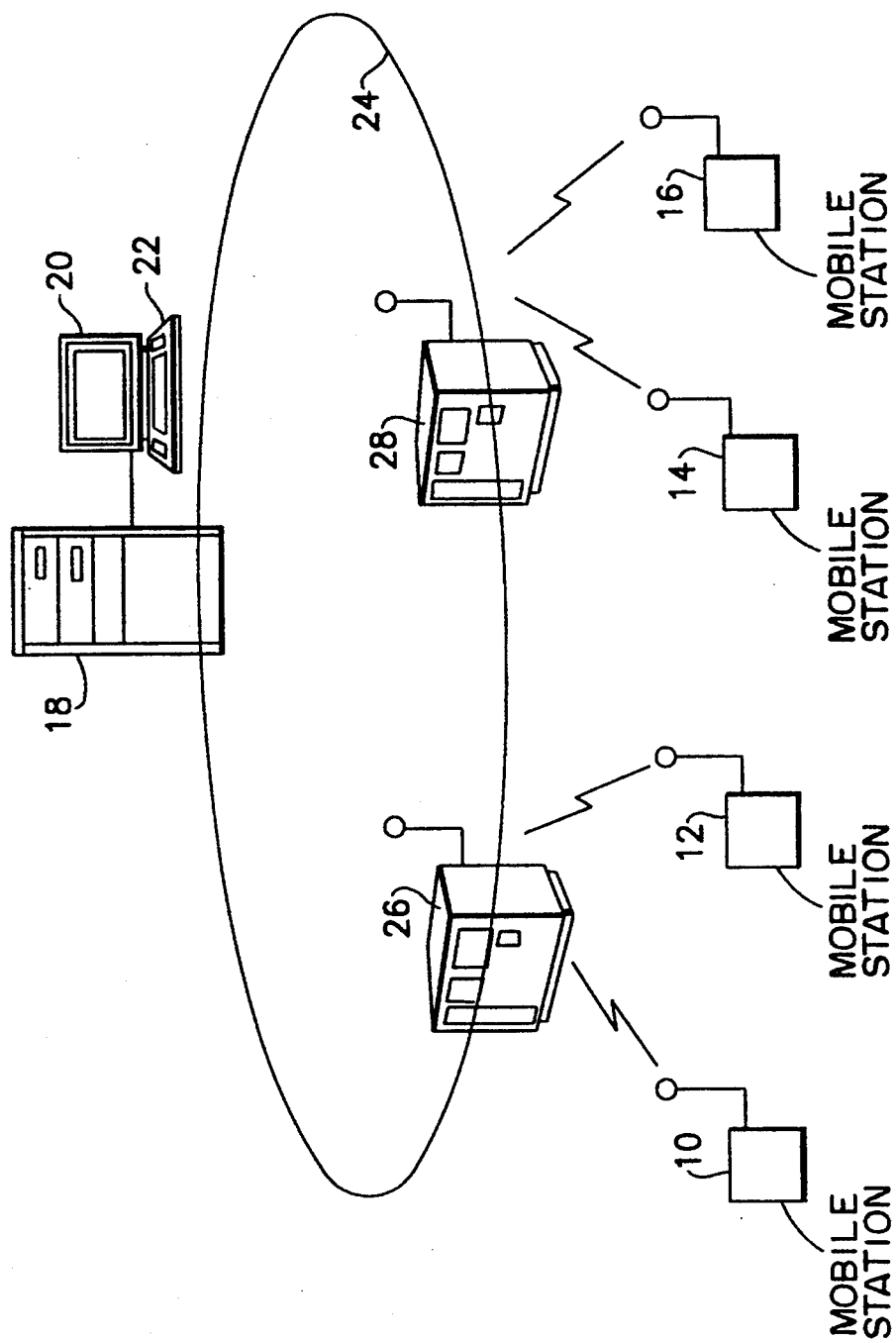
FIG. 1 is a pictorial diagram showing radio a data communication system of the type in which the invention is implemented.

Referring to FIG. 1, there is shown a radio system allowing communication between a plurality of mobile stations 10, 12, 14 and 16 and applications and data residing in a computing system. The computing system typically includes a Wireless Network Manager (WNM) or Wireless Network Controller 18, with attached monitor 20 and keyboard 22, of a local area network (LAN), generally indicated by reference number 24, having a plurality of attached workstations or personal computers (not shown for simplicity). Also attached to the LAN are one or more gateways 26, and 28 with which the mobile stations 10, 12, 14, and 16 to communicate. These gateways, referred to as base stations, are augmented according to the invention to provide certain radio system management functions which coordinate the mobile stations' access to the common radio channel. Communications between mobile stations are supported via relay through the base stations 26 and 28.

Figure 2:
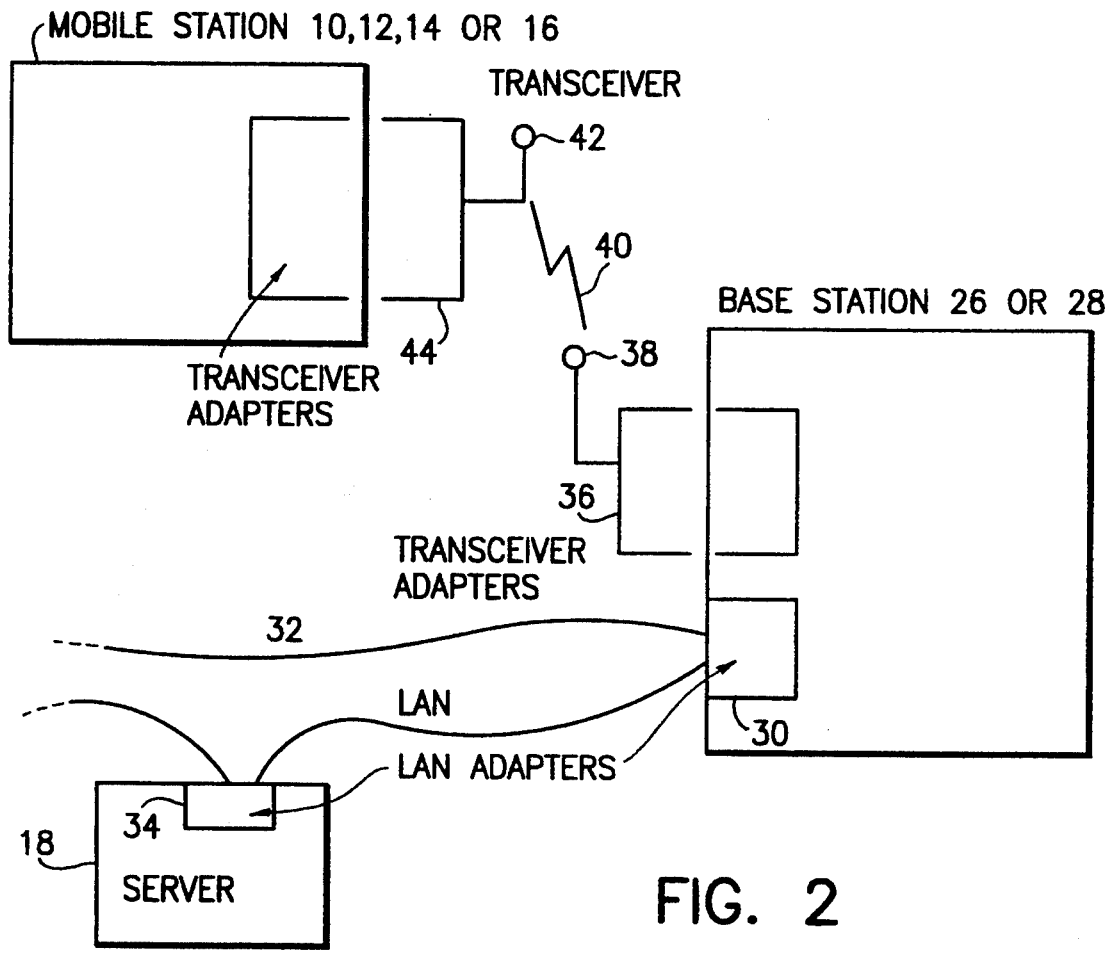
FIG. 2 is a block diagram of the system shown in FIG. 1 illustrating the basic components of a mobile station and a base station.

As shown in more detail in FIG. 2, a base station 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 has an antenna 38 by which a radio link 40 is established with one or more remote or mobile stations, 10, 12, 14, or 16. The mobile station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations, being conventional computers as previously stated, are further provided with software, which support their respective transceiver adapters.

The present invention is embodied in a radio communication network based on slow frequency hopping operation wherein control of the radio frequency of the radio transceivers determines a sequence of operating radio frequencies and their durations, appropriate to a mode of radio operation known in the radio art as "slow frequency-hopping." This mode of operation is described in the book Spread Spectrum Communications by Cooper and McGillem, published by McGraw-Hill for example. A particular instance of use of this mode of operation is regulated by part 15.247 of the regulations of the United States Federal Communications Commission.

Figure 3:
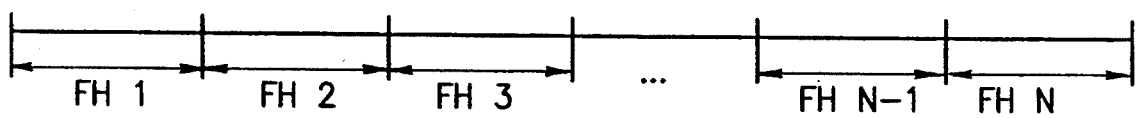
FIG. 3 is a data framing diagram showing a superframe structure implemented by the preferred embodiment of the invention.

FIG. 3 illustrates a particular instance of the use of radio carrier frequencies by a slow frequency-hopping system.

In multicellular radio communication networks, a remote station gains wireless access to the network by first requesting the services of a base station within its range. This process, called "Registration" is well known in the art. If a remote station is within the range of multiple base stations, it will register with exactly one base station, called its Home Base. Within a cell, the base station and all remote stations registered with it hop in synchronism and communicate with each other using the same carrier frequency. When a remote station changes its physical location, the signal quality to its home base can decline rapidly (due to wear signals or from interference) and eventually the remote station may lose access to its home base. Even when a remote station is stationary, communication path to the home base may be lost due to fading conditions. To retain continuity of wireless access, the remote station must re-register with another base station that can be reached along a propagation path of adequate signal quality. This process is called "handoff".

Time evolves as a sequence of frequency hops with each hop of a specified duration as shown in FIG. 3. The duration of such hops must satisfy the applicable regulatory constraints (such as FCC Part 15.247 rules in the U.S., and similar rules in other countries that may allow frequency-hopping based cellular radio operation). The base station will follow a cyclic frequency hopping pattern. A period of this cyclic hopping pattern structure will be called a superframe. FIG. 3 shows a superframe structure which consists of a finite number of frequency hops. For the rest of this example, it is assumed that all the hops within a superframe have the same length and all the base stations have the same number of hops within a superframe.

Each cell has its frequency hop pattern. The present invention relates to methods for the monitoring of base stations under three cellular network architectures. The first is tightly synchronized systems, where the superframe structure of a base station has a fixed timing offset relationship with respect to another base station. The second is loosely synchronized systems, where the superframe structure of a base station has a coarse timing offset relationship with respect to another base station. The timing offset is a bounded random variable. The third is unsynchronized systems, where each base station operates independently of other base stations. No fixed timing offset relationship exists in the superframe structures among the base stations. Methods for achieving synchronization are known in the art. The present invention provides methods and techniques for solving the following problems in a multicell network. (1) The selection of a home base by a remote station. (2) The identification of the measurements to be made for the purpose of selecting a home base. Such measurements are classified into those performed at i) the remote stations and ii) the base stations. (3) The initiation of the process of handoff. (4) The execution of handoff in multicellular networks in which the cells of the network are tightly synchronized or loosely synchronized or not synchronized at all. The first consideration in the in the implementation of the present invention is a discussion of handoff indicators.

In a multicellular slow frequency hopping-based radio system, an important problem is identifying a home base for a remote station when it is first turned on. This process begins with the remote station learning about the radio environment in which it is situated. Learning involves listening to the control messages broadcast by various base stations and the acquisition of variables of interest pertaining to them. After learning (i.e., acquiring the list of candidate home base stations), the remote station executes a selection algorithm on the measured variables. It chooses a home base to register with and acquires wireless access.

The header of a frame provides the following information for a remote station to monitor. Three different pieces of information, collectively referred to here as Handoff Indicators, are measured. They are (1) RSSI: Received Signal Strength Indicator. (2) HOR: Header Observation Rate, i.e., the rate of detected headers. (3) LV: Load Vector.

RSSI, the Received Signal Strength Indicator, is the primary handoff indicator. In a frequency hopping system, the measured value of RSSI varies from hop to hop as a result of frequency dependent fading. For stable system operation, the RSSI is sampled at multiple, different frequencies. The mean value of the multiple sample values of RSSI is used for making handoff decisions instead of a single measured value of RSSI. Sometimes, however, interference level is so high that RSSI can produce misleading results if used alone. Therefore, the following auxiliary handoff indicators are used.

HOR, the Header Observation Rate, is defined as the ratio of the number of headers received correctly divided by the total number of headers. For every frequency used for monitoring the radio environment, at least one header is expected from each base station within the range of the remote station. However, headers may be missed because of frequency dependent fading and/or other interference sources. With respect to a base station, a low HOR together with high RSSI usually indicates high interference level. HOR can be easily calculated in data transmissions if for instance, cyclic redundancy checks (CRC) are used for error detection purposes.

LV, the Load Vector, is a characteristic of the base station. It includes a vector of performance-oriented information relevant to the base station, such as the number of remote stations registered with it, the number of active remote stations, CPU utilization, buffer utilization etc. LV is included as part of the header information and used for the purpose of load balancing.

By monitoring the header transmissions from a base station, a remote station is able to accumulate knowledge of RSSI, HOR, and LV. Of these, both RSSI and HOR are characteristic of the channel and LV represents the traffic load at the base station.

The next consideration is a discussion of initial home base identification and methods for the selection of an initial home base station. In the following discussion it is assumed that a remote station has been synchronized to the frame structure and the frequency hopping pattern from its home base. A header for a frame structure can be transmitted from each base after the transmitting frequency has been switched (hopped) to a new frequency. The header message is used by a remote station to achieve both frame and superframe synchronization.

Figures 4, 5:
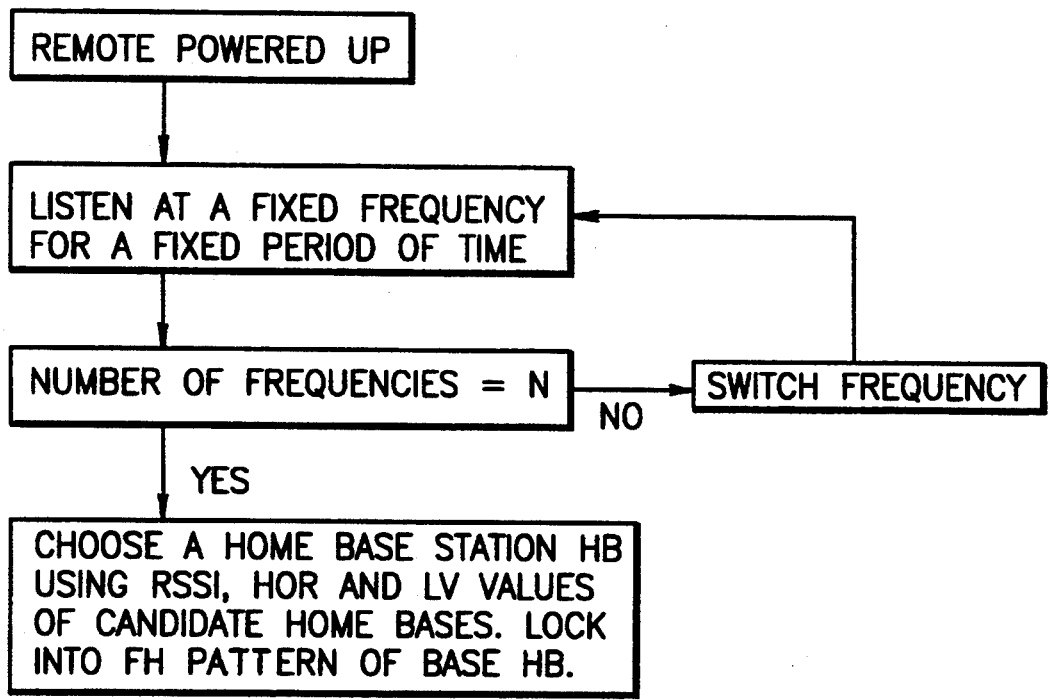
FIG. 4 is a flow diagram of the logic of the process by which a mobile station monitors neighboring bases.
FIG. 5 illustrates a tables of bases for the process of FIG. 4.

When a remote station is first powered up, it listens at a fixed frequency and searches for valid header messages from neighboring bases (see FIG. 4). All the aforesaid handoff indicators are monitored. After a fixed period of time, it switches to another frequency and keeps on monitoring. During this monitoring process, the remote station keeps a record of RSSI, HOR, and LV from each base station. A table as illustrated in FIG. 5 is constructed for all the bases which have been heard during the last N monitoring cycles (assuming K bases heard during the last N cycles).

After a fixed number of frequencies have been examined, the remote station selects a home base station and locks into its frequency hopping pattern. The algorithm used for selecting a home base using the information in Table 1 is described later.

A number (N) of frequencies are monitored prior to choosing an initial home base station because a single frequency transmission may suffer from frequency dependent fading. The frequency dependent fading has a Rayleigh distribution. Therefore, a remote station should depend on average RSSI observed at several frequencies in choosing an initial home base station.

RSSI is collected only when a header packet is received without error. A header will not be received correctly either due to very low received signal strength or interference. Therefore, use of HOR as an auxiliary indicator is important in making initial home base selection.

Another factor that is useful in selecting an initial home base is traffic load at the candidate bases. It may be preferable, for load balancing purposes, to choose a lightly loaded base instead of a heavily loaded base station even if the latter provides stronger received signal strength.

Figure 6:
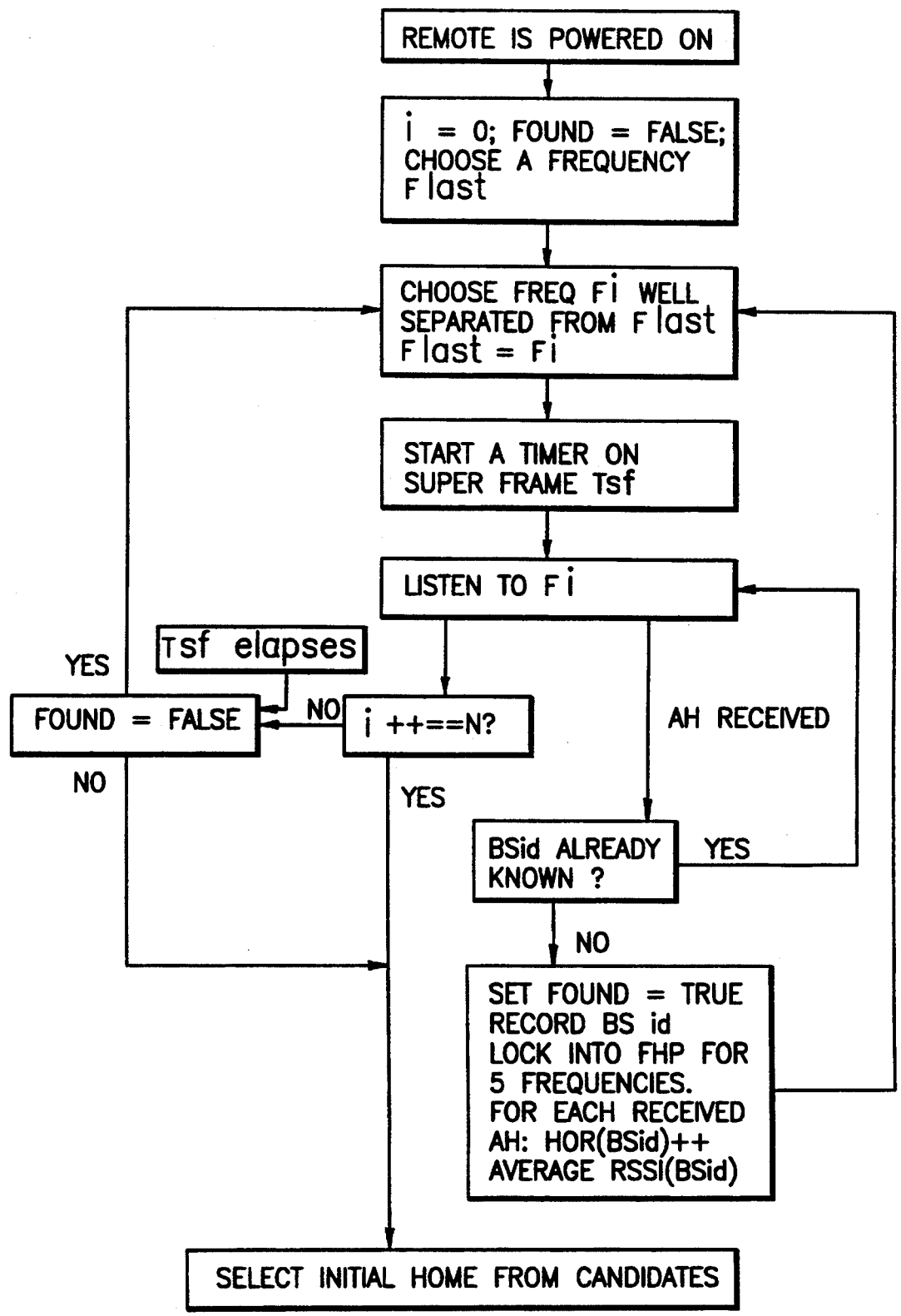
FIG. 6 is a flow diagram showing more detail of the logic of the process of FIG. 4.
Figure 7:
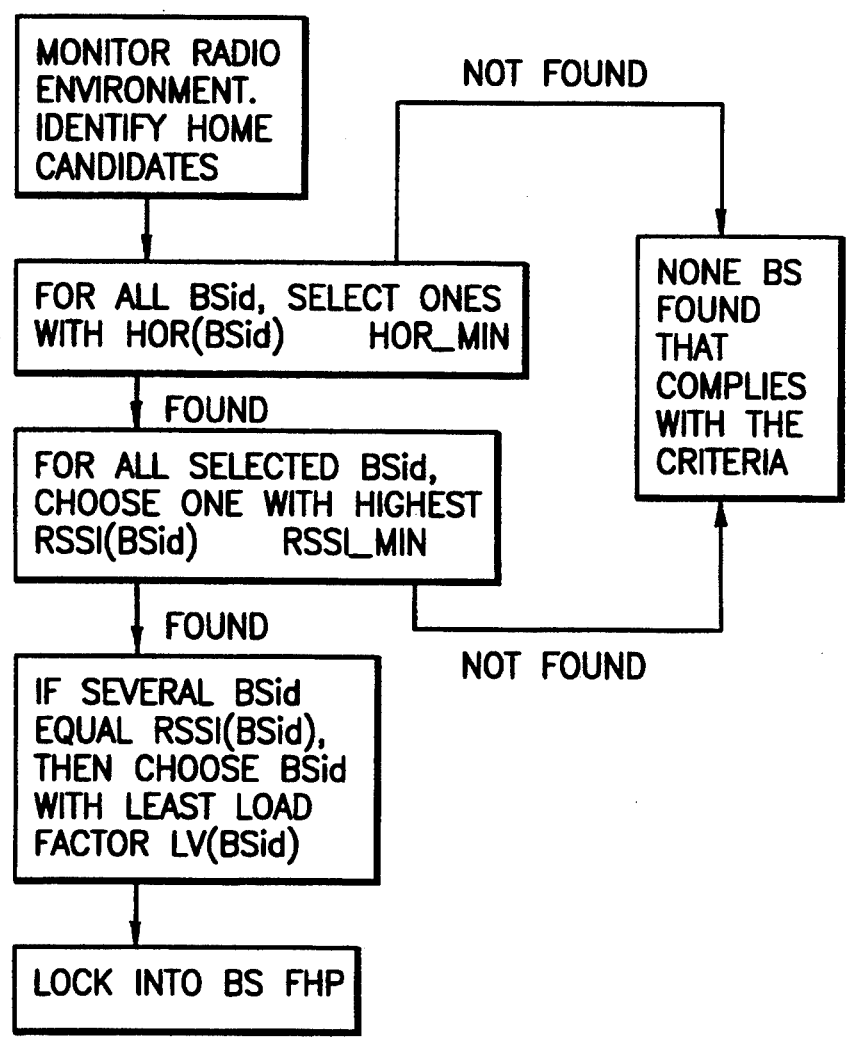
FIG. 7 is a flow diagram of the process for using hand off indicators to select a home base.

FIG. 6 is a more detailed view of radio monitoring steps shown in FIG. 4. When a new base is found, the two indicators RSSI (received signal strength indication) and HOR (header observation rate) are monitored during a fixed listening period (=the length of a superframe). The steps described in the flow chart of FIG. 6 will be understood by one skilled in the art. The expression i++==N? shown in FIG. 6 is composed of expressions used in "Programming Language C" and contained in the text "The C Programming Language, Kernigham and Ritchie, Prentice-Hall, 1978. More particularly the term "i++" indicates a variable i, incremented after its value is used. The term == indicates an equality comparison, and the term N indicates a variable. The expression "i++==N" is true if and only if the current values of "i" and "N" are equal. After the expression is evaluated, the value d "i" is incremented. A number (N=5) of frequencies are monitored in FIG. 7. Let the number of distinct frequency channels in the FH Spread Spectrum system be T. Let $g=T/N$. Let the bandwidth of each channel be $\Delta$. The frequencies to be monitored, $F_1, F_2, \ldots, F_N$ are chosen with respect to $F_1$ as follows:

$$F_i = F_1 + (i-1)g\Delta$$

If a remote station does not hear from any base in the wireless network, then it is out of the range of the wireless communication system.

The actual algorithm for selecting among several candidate home bases is a multicriteria based decision problem. A specific algorithm for using the handoff indicators to select a home base from candidate bases is set forth in FIG. 7. Alternate selection algorithms for utilizing the handoff indicators in a different manner are possible and are considered within the scope of this invention.

If at least one candidate base has been heard, the remote must choose it as its home base. If more than one candidate exists, then the chosen base will be the one, if any, which complies the most to some criteria, as described in FIG. 8.

Technique for monitoring for handoff will now be discussed. The first consideration is monitoring neighboring bases for accomplishing handoff. In order to accomplish handoff, the remote station is responsible for monitoring its home base as well as monitoring the connections from neighboring bases. Handoff decisions are based on the collected information.

In order to collect handoff indicator information from neighboring bases, a remote station has to know the answers to the following questions:

HQ_1) Who are the neighboring bases? How many of them should be monitored?

HQ_2) For each neighboring base, when does its header occur?

HQ_3) For each neighboring base, what frequency it will be on when its header data can be collected?

The next consideration is monitoring in a tightly synchronized system. In a tightly synchronized system, the superframe structure of a base has a fixed timing offset relationship with that of another base, i.e., frame synchronization among the bases are required. In such a system, if different bases use different cyclic shifts of the same frequency hopping pattern, then mutual interference can be greatly minimized.

Figure 8:
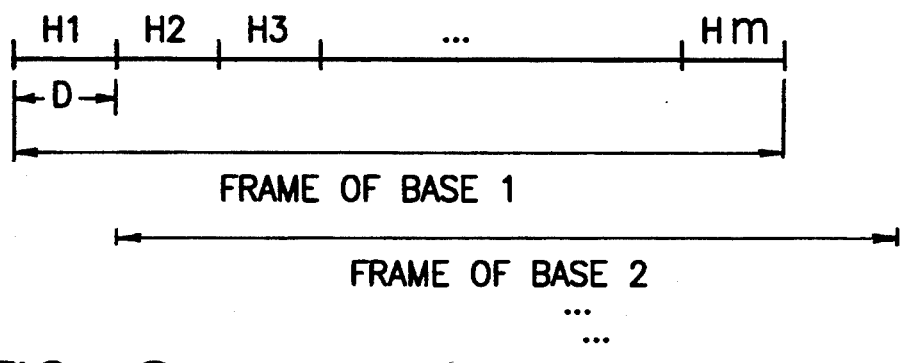
FIG. 8 is an illustration of a super frame containing neighboring bases synchronized with each other but offset in frame time.

For handoff monitoring of neighboring bases, the questions raised before can be answered together when the following conditions are satisfied:

(1) When all the neighboring bases are synchronized with each other in the superframe structure, but offset in frame time as shown in FIG. 8. The frame time of each base is offset by an integer multiple of a fixed delay D and their header messages only occur in non-overlapped time slots. In FIG. 8, m headers can be monitored in a frame whose duration is mD.

Figures 9, 10:
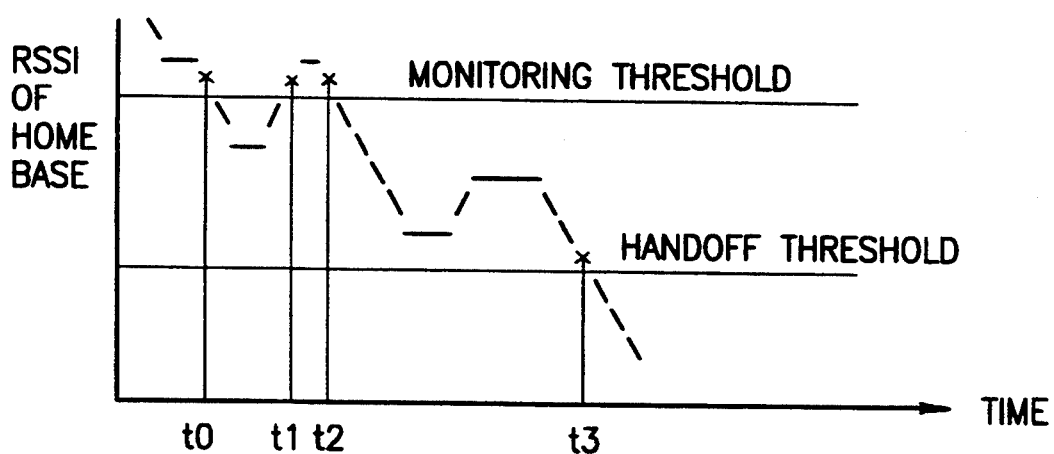
FIG. 9 is an illustration of a simple base location index structure.
FIG. 10 is an illustration of an example of a remote station signal indication.

(2) When both the frame delay and the frequency hopping pattern for each base can be associated with the base's location index. FIG. 9 illustrates a simple base location index structure. Which is assumed as a square-shaped cell.

In the example of FIG. 9, nine cells form a section and four sections (separated by solid lines) are shown. Assuming there are eight neighboring bases needed to monitor besides the home base, i.e., m=9, the index of the base location is used to represent a unique frequency hopping pattern (or a unique cyclic shift of the same pattern) and a unique delay time in the delay structure as shown in FIG. 8. For example, in a cluster of 9 cells bounded by dot lines in FIG. 9, the remainder of the base location index dividing by 9 can be used to represent the ideal delay of the frame (or hop) of each base in the delay structure FIG. 8. It can be guaranteed by this location indexing scheme that in any square-shaped cluster of 9 bases no overlap of header transmission will occur.

Under the two conditions, a home base can figure out the answers to the three handoff monitoring questions and pass the needed handoff monitoring information to a portable remote. The information includes both time offset (i.e., the phase difference) and frequency hopping patterns of all the neighboring bases. It is also possible that a portable remote can derive this information itself from the knowledge of indexes of neighboring bases. In this case, there is no need for message passing from the home base at all.

A synchronized system is more complicated to implement because it requires tight frame synchronization among the bases. Methods for achieving tight frame synchronization, among bases connected by a LAN, are known in the art. An important advantage of tight synchronization is that it facilitates handoff monitoring. In a synchronized system, portable remotes have exact knowledge of the frequencies the neighboring bases will use and their timing. It can also be assured that no two bases will transmit their headers at the same time. As a result, an ordered and fast handoff monitoring sequence can be established. For example, for a frame length of 50 msec and 9 bases to monitor (including the home base), an observation time slot for the header has a length of 5.5 msec. This slot length is long enough for a portable to switch frequency to monitor another base. In this case, 20 handoff indicator measurements per base per second can be achieved.

When monitoring in an unsynchronized system each base operates independently of other bases. No fixed timing offset relationship exists in the superframe structures among the bases. Although the bases can use quite accurate crystal oscillators to control their superframe timing, their superframe boundaries will still drift slowly with respect to each other. In this case, if neighboring bases use different phases (cyclic shifts) of the same frequency hopping pattern, the patterns could potentially overlap once in a while and interference would last for long periods of time. As a result, only frequency patterns with low probability of overlapping after random cyclic shifts should be used.

For example, assuming there are only 8 hopping frequencies, the patterns shown in Table I below can be used in an unsynchronized system.

TABLE I

| 3 | 5 | 2 | 7 | 6 | 4 | 0 | ← for base No. 1 |
| 0 | 6 | 1 | 4 | 5 | 7 | 3 | ← for base No. 2 |
| 6 | 0 | 7 | 2 | 3 | 1 | 5 | ← for base No. 3 |
| 1 | 7 | 0 | 5 | 4 | 6 | 2 | ← for base No. 4 |
| 4 | 2 | 5 | 0 | 1 | 3 | 7 | ← for base No. 5 |
| 5 | 3 | 4 | 1 | 0 | 2 | 6 | ← for base No. 6 |
| 7 | 1 | 6 | 3 | 2 | 0 | 4 | ← for base No. 7 |
| 2 | 4 | 3 | 6 | 7 | 5 | 1 | ← for base No. 8 |

The 8 patterns can be assigned to 8 neighboring bases. These patterns are generated using the known methods described in and have the property that for all the cyclic shifts among any two patterns, at most one frequency overlap occurs. Other methods for generating cyclically orthogonal patterns can also be used.

For handoff monitoring purpose, a base has to learn both the timing and the frequency hopping state of its neighboring bases, i.e., the answers of questions HQ_2 and HQ_3 discussed herein above, even if a mapping mechanism exists (as discussed herein above) which enables the base to derive another base's frequency hopping pattern from its location index. Assuming the frequency hopping pattern of another base can be derived from its location index, the only information needed for a portable remote in a nearby cell to monitor it is the delay of its superframe boundary with respect to the superframe boundary of the portable's home base. When the bases are connected by a LAN, software based methods for measuring the superframe delay (or the Timing Offset) at a base can be used.

After the superframe delay of a neighboring base is measured, both the hopping state and the timing of the neighbor are calculated by a base and passed to a portable. If there are neighbors, the base conveys both the hopping pattern and the superframe delay of each neighbor. The base might need to update the handoff monitoring information as frequently as needed. The update is needed because the frame boundaries of different bases will drift with respect to each other (the crystal oscillators in those bases are not synchronized). A portable remote, after receiving the handoff monitoring information from its home base, begin to monitor neighboring bases. The initial monitoring window length for each neighboring base should be long enough to accommodate the uncertainty of the superframe delay measurement. However, after the first successful monitoring, the portable remote will know more precisely about the timing offset and can reduce its monitoring window length accordingly.

The advantage of an unsynchronized system lies in that no synchronization is needed among neighboring bases and consequently its implementation will be much simpler. However, because the bases are uncoordinated, it is possible that their header messages will be overlapped in time and cannot all be monitored by a portable remote in the same frame. As a result, handoff monitoring will be slower.

It is, however, possible to reduce the header acquisition time, and hence, the handoff monitoring time, in several ways. For example, it was mentioned that each base transmits a header at the beginning of every frequency hop. This header could include a subset of the frequency hopping pattern table for that base. Thus, a remote can considerably shorten its monitoring time. While it is conceivable that the number of base header broadcasts within a hop could exceed one, it can be easily shown that the reduction in acquisition time is negligible.

Another way to reduce the acquisition delay is to monitor more than one frequency during a hop interval. This is advantageous if the hop interval is fairly large. This process has the effect of significantly reducing the average acquisition delay, but has drawback, in that the maximum acquisition delay has a finite probability of being infinite. This problem may be circumvented by introducing a fixed time delay into the frequency scanning process.

When monitoring in a loosely synchronized system the superframe structure of a base has a loose timing offset relationship with that of other bases. More specifically, the timing offset can be abounded random variable. Assuming the timing offset is always smaller than the amount that will cause interference to happen when noncontiguous cyclic shifts of the same frequency hopping patterns are used by different bases, we can greatly eliminate mutual interference.

For example, assuming synchronization errors among the bases are kept within the duration of a frame, then the following 4 patterns as shown in Table II below can be assigned to 4 neighboring bases without causing mutual interference.

TABLE II

| 0 | 1 | 2 | 3 | 4 | 5 | 6 | 7 | ← for base No. 1 |
|---|---|---|---|---|---|---|---|---|
| 2 | 3 | 4 | 5 | 6 | 7 | 0 | 1 | ← for base No. 2 |
| 4 | 5 | 6 | 7 | 0 | 1 | 2 | 3 | ← for base No. 3 |
| 6 | 7 | 0 | 1 | 2 | 3 | 4 | 5 | ← for base No. 4 |

Clearly, the number of patterns which can be used in a loosely synchronized system has been greatly reduced as compared to a synchronized system. The reduction factor depends on how accurate the loose synchronization is.

A base in a loosely synchronized system also tries to lock into both the superframe structure and the delay structure as shown in FIG. 8. From handoff operation point of view, a loosely synchronized system can be regarded as a combination of both a synchronized system and an unsynchronized system. It is like a synchronized system in the sense that both bases and portables can deduce both the frequency hopping pattern and the superframe delay of a neighboring base from the base's location index. On the other hand, it is more like an unsynchronized system in the sense that the knowledge of superframe delay is not precise. Therefore, initial monitoring window length for each neighboring bases should be long enough to accommodate the uncertainty in the superframe delay. After the first successful monitoring, the portable remote can reduce its monitoring window length in the subsequent monitorings.

The following discussion provides a simple example of handoff. It is assumed that a portable remote has obtained handoff monitoring information about its neighboring bases. This information can be very precise for a synchronized system and not precise for an unsynchronized system or a loosely synchronized system. In this section, a simple handoff example for a slow frequency hopping based indoor cellular radio network is described. The handoff example is general enough so that it can be applied to all the three systems described above. Here, RSSI is used as the major handoff indicator. The applications of other handoff indicators such as HOR and LV will be discussed in the next section.

FIG. 10 shows an example of RSSI (a sample mean as discussed before) measured at a portable remote about its home base as a function of time. The variation of RSSI is basically due to the movement of the portable remote in the building around its home base. At t0, the RSSI of the home base drops below a level called "monitoring threshold". At this point, the portable remote enters into handoff monitoring stage. That is, the portable remote begins to monitor all the potential new bases. At t1, the RSSI rises above the monitoring again. A monitor threshold is set up such that a portable remote can forget about handoff monitoring and does useful work when channel conditions are very good.

At t3, the RSSI further drops below a level called "handoff threshold". At this point, it is assumed that the portable remote has obtained enough information to make a handoff decision. The portable remote then sends a message to its home base and indicates that it has chosen a certain base for handoff. The home base then sends back an acknowledgement message to the portable remote.

No matter whether the portable remote receives the acknowledgement or not, it begins to register to its new base. This handoff registration can be realized by sending a message from the portable remote to the new home base. The new home base then handshakes with the old home base to update their routing tables and the status of communication. Then the new home base can acknowledge to the portable remote that handoff has been accomplished.

The exact levels of the monitoring threshold and the handoff threshold are system parameters and can be adjusted according to system operation needs. For example, a conservative handoff threshold can be set at a level which is 30 dB above the radio noise level. Assuming a 10 dB signal-to-noise ratio is needed to achieve a bit error rate of $10^{-5}$, there is less than 1 percent of time encountering higher than $10^{-5}$ bit error rate for a Rayleigh distributed RSSI at this handoff threshold level (result calculated from cumulative distribution function of Rayleigh distribution). A less conservative handoff threshold level can be 20 dB above the noise level. In this case, there is less than 10 percent of time encountering higher than $10^{-5}$ bit error rate when the RSSI is at this level.

For a system which needs fast handoff, it will be appropriate to set level of monitoring threshold well above the level of handoff threshold. As a result, a portable remote knows exactly which new base to choose when it crosses the handoff threshold. An implication of this handoff strategy is that a portable remote might spend valuable time and power in monitoring other bases rather than transmitting or receiving useful data. On the other hand, for a system which does not need fast handoff, the level of monitoring threshold can be set lower. In the extreme case, the level of monitoring threshold can be set to be at the same level as the handoff threshold. In this case, a portable remote begins to monitor other bases only when its RSSI drops below the handoff threshold.

A way to achieve more efficient handoff monitoring is to adapt the monitoring speed with the speed of change in the observed handoff indicators. For a portable remote which does not move or moves very slowly, the handoff monitoring speed can be much lower than the case when a portable remote moves fast. When people are using portable remotes, they usually come to standstill or move very slowly. As a portable remote does not need to spend much time in monitoring, it can spend most of the time doing useful work. On the other hand, when people move fast, they seldom do any work on portable remotes. The portable remotes then can spend more time in monitoring other bases. Therefore, it may be desirable to set the level of monitoring threshold well above the level of handoff threshold when the handoff monitoring speed can be adapted.

In this section, the applications of the other two handoff indicators: HOR and LV are discussed. In radio data transmission modems, RSSI is usually collected when a packet is received without error. Therefore, a packet error can be regarded equivalently as having a very bad RSSI level (say at the radio sensitivity level). This equivalent RSSI level can be used together with other measured RSSI levels in the RSSI sample mean calculation. Another way to use HOR is to treat it as a totally separate indicator. When the HOR of the home base measured at a portable exceeds a certain threshold, the portable begins the handoff monitoring process, just as the case when RSSI drops below the monitoring threshold. In the same way, when the HOR exceeds a higher threshold, the portable begins to enact handoff, regardless the level of the RSSI indicator. Handoff decisions depend on both RSSI and HOR information gathered from neighboring bases. A combined cost function based on the two indicators for selecting a new home base can be constructed. For example, HOR can be used as the first criteria in choosing a new base. If there are several bases with the same low HOR, the base with the highest RSSI can be chosen as the new base.

LV, as discussed before, is a handoff indicator used for load balancing purpose. It can be used to achieve load balance in the following two ways:

(1) During handoff, a portable remote can choose a less heavily loaded base as a new base if other handoff indicators are similar among several candidates.

(2) If a cell is heavily loaded with data traffic, the base associated with the cell can send a load control message to all the active portable remotes in the cell. The load control message contains a suggested handoff RSSI level which is higher than the handoff threshold level discussed before. Those active portable remotes with RSSI level from the base below the suggested RSSI level begin to handoff to other bases. By controlling the suggested handoff RSSI level, a base can dispersed its traffic load to neighboring bases to various degree.

What has been described are three system architectures which can be used to establish a slow frequency hopping based indoor cellular radio application. These three systems differ in their different requirement on synchronization among the bases on a LAN. In one system, bases are tightly synchronized in their superframe structures with respect to each other. This system is more difficult to implement. However, it allows for fast handoff monitoring and the possibility of interference elimination when different phases of the same frequency hopping pattern are used at the bases. In another system, each base operates independently of other bases. This system is the simplest in implementation. However, handoff monitoring is slower and interference can be a serious problem. In this system, different frequency patterns with low overlapping probability after random cyclic shifts should be used. In the last system, base are loosely synchronized with each other. This system eliminates the potential interference problem when noncontiguous cyclic shifts of the same frequency hopping pattern are used at different bases. Nevertheless, its handoff monitoring is still slower than a synchronized system due to the looseness in synchronization.

While the invention has been particularly shown and described with respect to a preferred embodiment thereof, it will be understood by those skilled in the art that changes in form and details may be made therein without departing from the scope and spirit of the invention.

What is claimed is:

1. A method for handoff monitoring in a wireless communication system including a local area network connected to a plurality of base stations, each of which has a geographic area, defined as a cell, within which a plurality of mobile stations having transceivers can communicate with a base station within each of a plurality of said cells, with each such base station being capable of performing bidirectional wireless communication with one or more of said mobile stations under control of a controller, with communication between base stations and mobile stations being performed by frequency hopping, with there being n available frequency hopping channels in a fixed frequency band, with each channel being of a same fixed time duration and having a fixed frequency different than another channel, the base station in each of said cells having receivers each tuned to respective ones of the channels assigned to the cell for receiving signals of the mobile stations within the cell, a cluster of said cells having a network control system through which said mobile stations within said cells communicate with each other, said network control system operating in conjunction with hand-off apparatus for handing off a mobile station from a first of said base stations to a second of said base stations as the mobile station travels from the first cell to the second cell, said hand-off apparatus being responsive to the strength or quality of signals monitored at a mobile station, said method for handoff monitoring comprising the steps of:

step 1; determining for a given mobile station that the quality of transmission between said given mobile station and a current base station has degraded below a predetermined performance level;

step 2; said given mobile station listening to each of successive ones of said n frequency channels for a time duration substantially less than said fixed time duration of a channel until said given mobile station senses a transmission from another of said base stations above said predetermined performance level; and step 3; transferring control of said mobile station by hand off to said another one of said base stations in response to said sensed transmission above said predetermined performance level.

2. A method according to claim 1 wherein said Step 1 includes each of said base stations in said wireless communication system generating and transmitting a wireless signal composed of a cyclic time sequence of frequencies hops in a superframe wherein each hop is of the same duration and length, wherein said transmitted wireless signal includes header information including Received Signal Strength Indicator data, Header Observation Rate data and Load Vector data.

3. A method according to claim 2 wherein, in said Step 2, said Received Signal Strength Indicator data is sampled by said mobile stations at multiple different transmitted frequencies and the mean value of said sampled samples is measured.

4. A method according to claim 2 wherein, in Step 2 said Header Observation Rate data is the number of transmitted headers received correctly by said mobile station divided by the total number of possible headers.

5. A method according to claim 4, wherein, in Step 2 said Load Vector data indicates the number of remote stations communicating with said base station.

6. A method according to claim 5 wherein, in Step 3 said mobile station selects and transfers control to a base station, referred to as a home base station, in accordance with the values of said Received Signal Strength Indicator data, said Header Observation Rate data and Load Vector data received by said mobile station.

7. A method according to claim 6 wherein, in said Step 3, said control of said mobile station is transferred by handoff from said home base station to another base station when said Received Signal Strength Indicator data and said Header Observation Rate data transmitted from said home base station decrease in strength and quality below a selected value.

8. A method according to claim 7 wherein the wireless signal composed of a cyclic time sequence of frequency hops in each cell of said plurality of cells is synchronized with the wireless signal composed of a cyclic time sequence of frequency hops in all of said other cells in said wireless communication system.

9. A method according to claim 7 wherein the wireless signal composed of a cyclic time sequence of frequency hops in each cell of said plurality of cells is loosely synchronized with the wireless signal composed of a cyclic time sequence of frequency hops of some or all of said other cells in said wireless communication system.

10. A method according to claim 7 wherein the wireless signal composed of a cyclic time sequence of frequency hops in each cell of said plurality of cells is not synchronized with any of the wireless signal composed of a cyclic time sequence of frequency hops of said other cells in said wireless communication system.

* * * * *